(12) United States Patent
Lund et al.

(10) Patent No.: US 6,284,065 B1
(45) Date of Patent: Sep. 4, 2001

(54) BEARING STEEL

(75) Inventors: Thore Lund; Staffan Larsson; Patrik Ölund, all of Hofors; Roger Björn, Nödinge; Mikael Sundqvist, Göteborg, all of (SE)

(73) Assignee: Ovaka Steel AB, Hofors (SE)

( * ) Notice: Subject to any disclaimer, the term of this patent is extended or adjusted under 35 U.S.C. 154(b) by 0 days.

(21) Appl. No.: 09/522,011

(22) Filed: Mar. 9, 2000

(30) Foreign Application Priority Data

Mar. 10, 1999 (SE) .................................... 9900863

(51) Int. Cl.$^7$ .................................... C22C 38/44
(52) U.S. Cl. .................... 148/335; 148/908; 384/912
(58) Field of Search .................... 148/908, 335; 384/625, 912

(56) References Cited

FOREIGN PATENT DOCUMENTS

406287710A * 10/1994 (JP) .

\* cited by examiner

*Primary Examiner*—Deborah Yee
(74) *Attorney, Agent, or Firm*—Burns, Doane, Swecker & Mathis, L.L.P.

(57) ABSTRACT

An improved bearing steel, adapted for the manufacturing of thick-walled bearing rings, containing, in weight-%:

| | |
|---|---|
| C | 1.00–1.10 |
| Si | 0.15 max |
| Mn | 1.35–1.65 |
| Cr | 1.70–1.90 |
| Ni | 1.00–1.15 |
| Mo | 0.40–0.50 |
| Cu | 0.30 max. |
| Al | 0.015–0.050 | the balance being Fe and normal residual elements and contaminants.

3 Claims, No Drawings

BEARING STEEL

FIELD OF THE INVENTION

The present invention relates to an improved bearing steel, and more specifically, to a bearing steel that makes it possible to through harden thick-walled components such as large roller bearing rings.

BACKGROUND OF THE INVENTION

Currently, the steel used in the manufacture of roller bearing components with the best possible hardenability is believed to be the steel according to DIN 100CrMo7 4, containing 0.92–1.05% C, 0.25–0.4% Si, 0.6–0.8% Mn, 1.65–1.95% Cr, and 0.4–0.5% Mo.

In the manufacture of thick-walled components, such as large roller bearing rings having a wall thickness of 200 mm and up, it is very difficult if not impossible to obtain through hardening of the component. Without proper through hardening, the core will be unstable resulting in large deformations of the component during the hardening and also a reduction of the strength of the component. These large deformations necessitate manufacture of the component in dimensions which allow grinding of the component into the desired measures and straightness. Grinding of one ring may take up to 2 weeks, which adds considerably to the costs.

Generally, in order to improve hardenability, carbide formers as Cr and Mo are added. However, because of the high carbon content of bearing steels, additional amounts of Cr and Mo can cause excessive formation of easily fusible carbides which segregate and are enriched in the core, leading to porosity. In order to be able to produce dimensionally stable, through hardenable thick-walled components, there is a long felt, yet unfulfilled need for an improved bearing steel.

SUMMARY OF THE INVENTION

The present invention eliminates the problems discussed above, and others, by providing an improved bearing steel suitable for producing through hardened, thick-walled components for roller bearings.

This is achieved with the improved bearing steel according to the invention containing, in weight-%:

| | |
|---|---|
| C | 1.00–1.10 |
| Si | 0.15 max |
| Mn | 1.35–1.65 |
| Cr | 1.70–1.90 |
| Ni | 1.00–1.15 |
| Mo | 0.40–0.50 |
| Cu | 0.30 max. |
| Al | 0.015–0.050 | the balance being Fe and normal residual elements and contaminants.

DETAILED DESCRIPTION OF PREFERRED EMBODIMENTS

With the bearing steel according to the invention the problems according to the prior art are eliminated, and the improvement of the hardenability which is obtained makes it possible to through harden components with wall thicknesses well above 200 mm.

According to the invention, the level of Cr and Mo are kept essentially the same as in the grade 100CrMo7 4, which is traditionally used for large cross sections. Ni is added to the conventional alloy in an amount between 1.00–1.15 weight-%. The Mn content is increased to 1.35–1.65 weight-%, while according to the prior art the Mn concentration is 0.35–0.45 weight-%. Ni and Mn do not form carbides and will, consequently, not enhance the risk for precipitation of detrimental primary carbides during solidification.

Further, the Si content has been lowered compared to 100CrMo7 4, down to no more than 0.15 weight-%. By lowering the Si content, the bainite transformation rate is increased. Si has a strong influence on the bainite transformation rate compared to Ni and Mn. A lower Si content will, to some extent, counteract the increased transformation time caused by the increased alloying content.

Comparative Test Results

In a comparative test, rings having a wall thickness of about 200 mm were manufactured from 100CrMo7 4 steel and from the steel according to the invention, respectively.

The respective rings were hardened resulting in a distortion of about 2 mm with the conventional steel, while the ring manufactured from the steel according to the invention exhibited a distortion in the order of 10 μm.

When testing the through hardening of the respective rings, the rings manufactured from 100CrMo7 4 had a hardness of 45 HRC in the middle of the cross section of the ring wall, while the rings made of the steel according to the invention exhibited a hardness of 57 HRC all the way through the wall.

EXAMPLE

Tests were performed on an bearing having a wall thickness of 190 mm.

The structure obtained was fine grained bainite.

The obtained hardness was 57–58 HRC, compared with the hardness level obtained with the material used "conventionally" being 49–53 HRC.

An isotropic volume increase due to hardening was obtained when the steel of the present invention was hardened and resulted in uniform grinding allowances in contrast to the "conventional steel composition" which gives faulty eccentric running of 0.15 mm per meter which, in combination with distortions of the ring of up to 2.5 mm, result in very long grinding times, and in many cases there will be insufficient material removal leaving hot rolled surfaces after grinding.

While the present invention has been described by reference to specific embodiments and examples, it should not be construed as limited thereto. To the contrary, the present invention is limited only by the scope and spirit of the appended claims.

We claim:

1. A bearing ring having a cross-sectional wall thickness of at least 190 mm made from a bearing steel comprising, in weight %:

| | |
|---|---|
| C | 1.00–1.10 |
| Si | 0.15 max |
| Mn | 1.35–1.65 |
| Cr | 1.70–1.90 |
| Ni | 1.00–1.15 |
| Mo | 0.40–0.50 |
| Cu | 0.30 max |
| Al | 0.015–0.050 | the balance being Fe and normal residual elements and contaminants.

2. The bearing ring of claim 1 having a hardness of 57HRC throughout the entire wall thickness.

3. AThe bearing ring of claim 1, wherein the ring exhibits an isotropic volume increase upon hardening.

* * * * *